(12) United States Patent
Chien

(10) Patent No.: US 8,811,684 B2
(45) Date of Patent: Aug. 19, 2014

(54) IMAGE RECOGNITION METHOD

(75) Inventor: Shih Chi Chien, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 477 days.

(21) Appl. No.: 13/005,931

(22) Filed: Jan. 13, 2011

(65) Prior Publication Data
US 2011/0176733 A1 Jul. 21, 2011

(30) Foreign Application Priority Data

Jan. 18, 2010 (TW) ................................ 99101198 A
May 20, 2010 (TW) ................................ 99116043 A

(51) Int. Cl.
*G06K 9/00* (2006.01)
(52) U.S. Cl.
USPC .......................................... 382/118; 382/181
(58) Field of Classification Search
USPC ........................................................ 382/181
See application file for complete search history.

(56) References Cited

U.S. PATENT DOCUMENTS

| 4,183,013 | A | 1/1980 | Agrawala et al. |
| 7,466,848 | B2 | 12/2008 | Metaxas et al. |
| 2001/0031072 | A1* | 10/2001 | Dobashi et al. ............... 382/118 |
| 2005/0013486 | A1 | 1/2005 | Wiedemann et al. |
| 2006/0245649 | A1* | 11/2006 | Chen et al. .................... 382/173 |
| 2006/0245652 | A1* | 11/2006 | Chen ............................. 382/181 |
| 2008/0253656 | A1 | 10/2008 | Schwartzberg et al. |

FOREIGN PATENT DOCUMENTS

| CN | 101499169 | 8/2009 |
| TW | 200639734 | 11/2006 |
| TW | 200703148 A | 1/2007 |

* cited by examiner

*Primary Examiner* — Hadi Akhavannik
(74) *Attorney, Agent, or Firm* — Lowe Hauptman & Ham, LLP

(57) ABSTRACT

The present invention provides an image recognition method for recognizing a plurality of objects in an image, wherein each object is composed of a plurality of image segments. The image recognition method includes the steps of: sequentially acquiring every pixel of the image; identifying a start point of a newly detected image segment; recording information of the newly detected image segment pixel-by-pixel from the start point; identifying an end point of the newly detected image segment; recognizing an object to which the newly detected image segment belongs according to the start point and the end point of the newly detected image segment; and identifying an invalid object or a merged object thereby releasing the data space thereof.

18 Claims, 4 Drawing Sheets

IMAGE RECOGNITION METHOD

CROSS REFERENCE TO RELATED APPLICATION

This application claims the priority benefit of Taiwan Patent Application Serial Number 099101198 filed on Jan. 18, 2010 and Taiwan Patent Application Serial Number 099116043, filed on May 20, 2010, the full disclosure of each of the above-listed prior applications is incorporated herein by reference.

BACKGROUND

1. Field of the Invention

This invention generally relates to an image recognition method and, more particularly, to an image recognition method that is able to perform real-time recognition and recognize multiple objects without recording the entire image.

2. Description of the Related Art

For current image processing techniques, the recognition of an arbitrary number of objects in an image generally requires the use of different image recognition algorithms. However, the calculation in the conventional algorithms grows in complexity with an increase in the number of objects to be recognized in an image. For example, complicated region growing computational rules have to be used such that the entire image (full image) has to be stored in an image buffer of an image processing system in advance, and complicated recognition processes have to be performed to recognize each object in the image after all image information are collected. Therefore, conventional recognition processes not only occupy a large amount of memory resources of the image buffer but also consume much time.

SUMMARY

Therefore, it is an object of the present invention to provide an image recognition method for recognizing a plurality of objects without the need of recording the entire image so as to effectively save memory resources.

It is another object of the present invention to provide an image recognition method for recognizing multiple objects that has a high expandability, is not constrained by the number of objects in an image and is able to recognize each object in real-time.

It is a further object of the present invention to provide an image recognition method for recognizing multiple objects that can identify a merged object and/or an invalid object during object recognition procedure so as to determine whether to release unused data space thereby further saving memory resources being occupied.

To achieve the above objects, the present invention provides an image recognition method for recognizing a plurality of objects in an image, wherein each object is composed of a plurality of image segments. The image recognition method includes the steps of sequentially acquiring every pixel of the image; identifying whether a pixel is a start point of a newly detected image segment during acquiring each pixel; recording information of the newly detected image segment pixel-by-pixel from the start point; identifying an end point of the newly detected image segment during recording the information thereof; recognizing an object to which the newly detected image segment belongs according to the start point and the end point; identifying whether there is a complete object; identifying whether the complete object is an invalid object when a complete object is identified; and releasing a data space of the invalid object when an invalid object is identified.

The present invention further provides an image recognition method for recognizing a plurality of objects in an image, wherein each object is composed of a plurality of image segments. The image recognition method includes the steps of: sequentially acquiring every pixel of the image; identifying whether a pixel is a start point of a newly detected image segment during acquiring each pixel; recording information of the newly detected image segment pixel-by-pixel from the start point; identifying an end point of the newly detected image segment during recording the information thereof; recognizing an object to which the newly detected image segment belongs according to the start point and the end point; identifying whether there is a merged object; and releasing a data space of the merged object when a merged object is identified.

The present invention further provides an image recognition method for recognizing a plurality of objects in an image, wherein each object is composed of a plurality of image segments. The image recognition method includes the steps of: sequentially acquiring every pixel of the image; identifying whether a pixel is a start point of a newly detected image segment during acquiring each pixel; recording information of the newly detected image segment pixel-by-pixel from the start point; identifying an end point of the newly detected image segment during recording the information thereof; recognizing an object to which the newly detected image segment belongs according to a space relationship between the newly detected image segment and every image segment of the objects in a previous row or a previous column; and identifying an invalid object or a merged object to release a data space thereof.

In another aspect, the image recognition method of the present invention further includes the step of: associating the information of the newly detected image segment being recorded to the object to which the newly detected image segment belongs, wherein the information of the newly detected image segment (e.g. the coordinates of two side points and pixel values of every pixel) may be recorded in a register.

In the image recognition method of the present invention, when the acquisition of all pixels in one row or one column is accomplished, an object is identified as a complete object when there is no newly detected image segment associated thereto; when a size or an average brightness of a complete object is not within a predetermined range, the complete object is identified as an invalid object; and when the newly detected image segment simultaneously belongs to a plurality of objects, a merged objet is identified.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
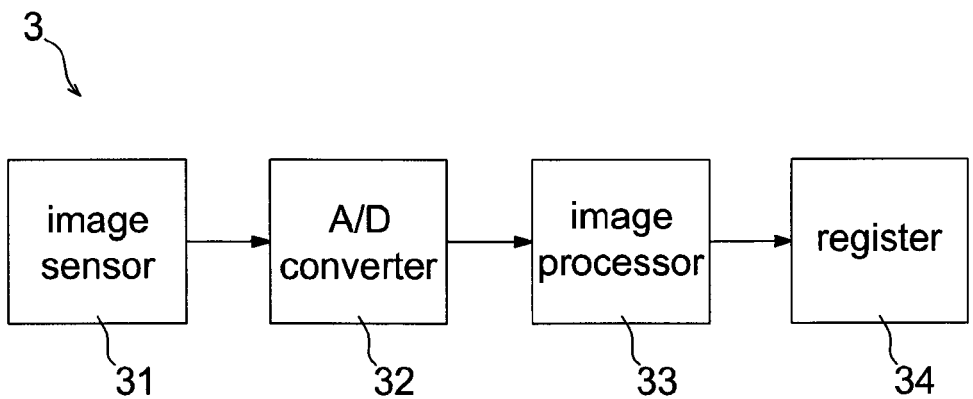
FIG. 1 shows a block diagram of the image processing system according to an embodiment of the present invention.

Referring to FIG. 1, the image recognition method for recognizing multiple objects according to an embodiment of the present invention may be implemented in an image processing system 3. The image processing system 3 includes an image sensor 31, an analog-to-digital converter (A/D converter) 32, an image processor 33 and a register 34. The image sensor 31 may be a CCD image sensor or a CMOS image sensor and is configured to sense the reflective light, emitted light or blocking shadow of at least one object to be recognized (not shown) to generate an analog image signal. Then the analog image signal is sent to the A/D converter 32 to be converted to a digital image signal. The image processor 33 is responsible for signal processing of the digital image signal. In another embodiment, the A/D converter 32 may be included in the image sensor 31.

It is noted that the image processing system 3 of the present invention may be used in an image capturing device, such as a video camera, for providing image recognition function. In another embodiment, the image processing system 3 may be implemented as image recognition software installed in a computer for recognizing images acquired by a video device. In addition, since the structures and principles of the image sensor 31, A/D converter 32, image processor 33 and corresponding elements are well known in the art, details thereof will not be described herein. The feature of the present invention resides in the use of the image processor 33 in combination with the register 34 to perform the recognition function of multiple objects in an image, and only those components which are pertinent to the feature of the present invention will be illustrated hereinafter. In addition, in another embodiment the register 34 may be included in the image processor 33 or other components and is not limited to that disclosed in FIG. 1.

Figure 2:
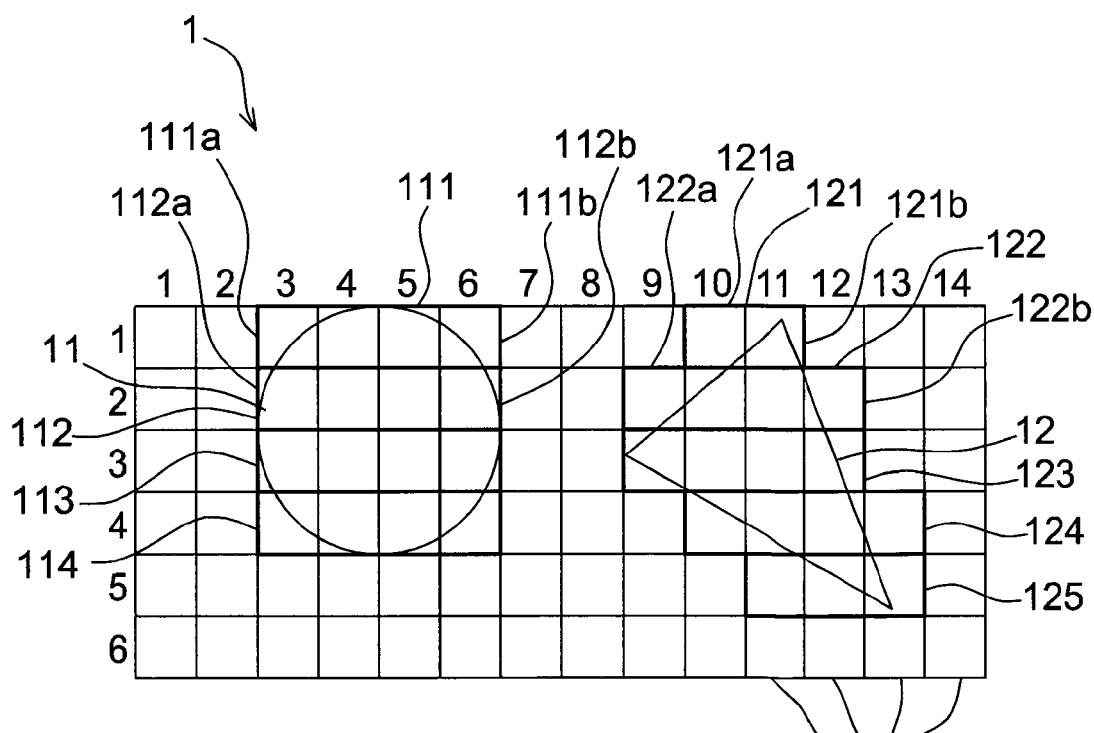
FIG. 2 shows a schematic diagram of an image used to explain the image recognition method of the present invention.

Referring to FIGS. 1 and 2, the image recognition method of the present invention is used to recognize an arbitrary number of objects in an image 1 (as shown in FIG. 2) captured by the image sensor 31 without requiring the image 1 to be recorded in its entirety. In this embodiment, the objects to be recognized in the image 1 are exemplified by a circular object 11 and a triangular object 12 for illustrating the recognition steps.

It is noted that as the image sensor 31 includes a plurality of pixels 311 arranged in a matrix and the plurality of pixels 311 sense every object 11 and 12 row-by-row or column-by-column. Thus a partial image of the object in each row or column sensed by the image sensor 31 is referred to an image segment herein. For example as shown in FIG. 2, the circular object 11 is composed of four rows of image segments 111 to 114 and the triangular object 12 is composed of five rows of image segments 121 to 125. It is appreciated that whether an image segment is referred to one row of pixels or one column of pixels may be determined according to the operation of the image sensor 31. Although the image segment is exemplified by a row of pixels in the following illustration, it is only an interpretation rather than a limitation of the present invention.

Figure 3:
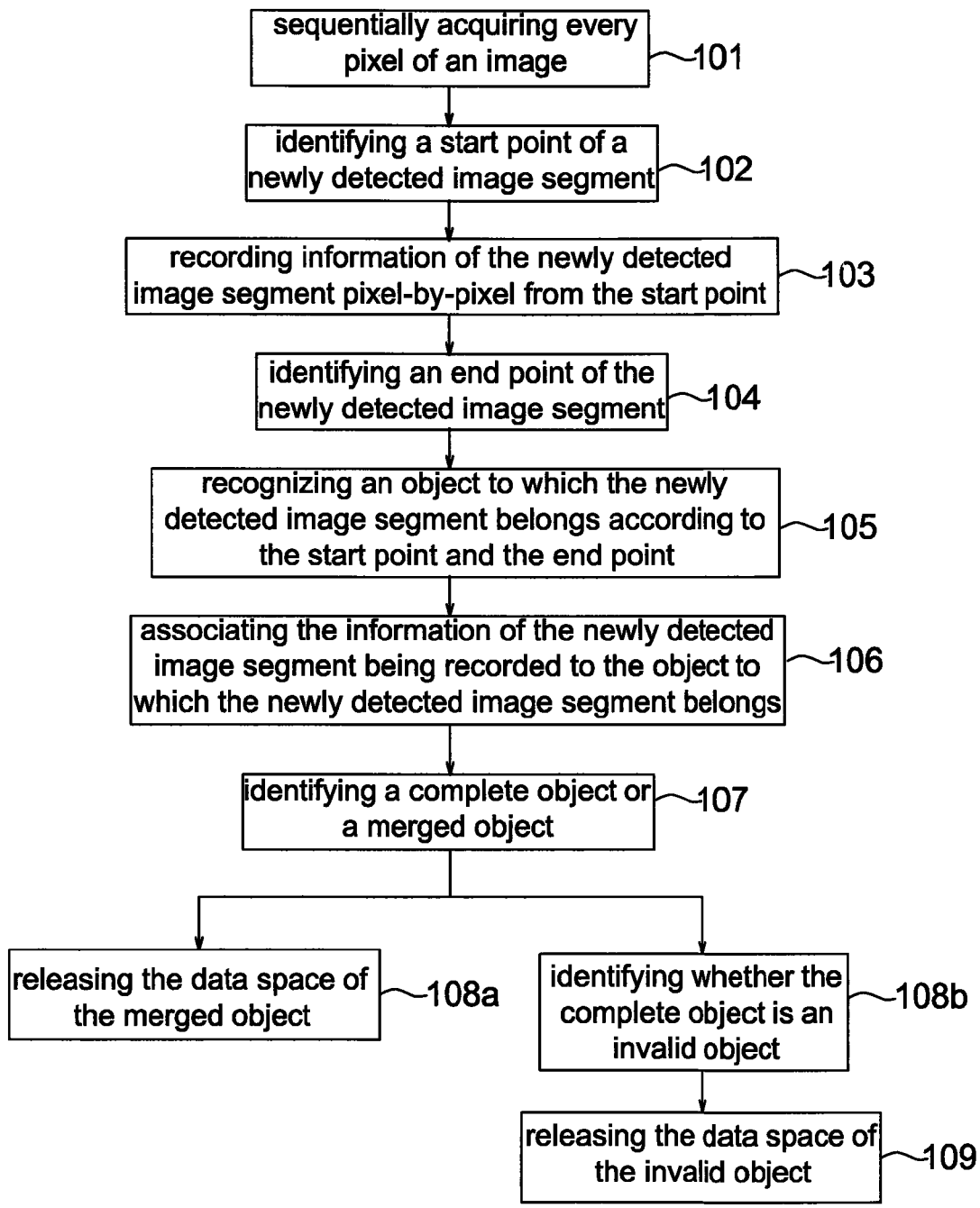
FIG. 3 shows a flow chart of the image recognition method according to an embodiment of the present invention.

Referring to FIGS. 1 to 3, the steps of, as well as the principles behind, the image recognition method for recognizing multiple objects of the present invention will be described in detail hereinafter. At first, the image sensor 31 captures an image 1, and the image processor 33 sequentially acquires every pixel of the image 1 from the A/D converter 32 (Step 101). In an embodiment, the image processor 33 acquires every pixel of the first row from left to right pixel-by-pixel, and then successively acquires every row from up to down.

During acquiring a pixel, the image processor 33 identifies whether the pixel is a start point of a newly detected image segment, wherein the newly detected image segment is an image section located in currently inspected row; if yes, its coordinates and pixel value will be stored in the register 34 (Step 102).

Next, the image processor 33 records information (e.g. pixel value) of the newly detected image segment pixel-by-pixel from the start point and stores the information in the register 34 (Step 103).

During recording the information of the newly detected image segment, the image processor 33 identifies an end point of the newly detected image segment and stores its coordinates and pixel value in the register 34 (Step 104); wherein a method of identifying an image segment of an object in Steps 102 to 104 is to identify whether there is any pixel value larger than a system predetermined threshold value and the setting of the threshold value may be determined by a user himself or herself, according to a reference image or using a variation of successive pixel values as the threshold value. For example, the threshold value may be a ratio or an offset of the average brightness of an immediately previous image captured by the image sensor 31, but the threshold value of the present invention is not limited to these.

Next, the image processor 33 recognizes an object to which the newly detected image segment belongs according to a space relationship between the newly detected image segment and every image segment of the objects located in an immediately previous row or an immediately previous column (Step 105).

In this embodiment, a newly detected image segment is recognized belonging to an object i if the space relationship matches following equation 1:

$$Seg\_L \leq Preline\_Obji\_R; \text{ and}$$

$$Seg\_R \geq Preline\_Obji\_L.$$

where, assuming that the $y^{th}$ row of the image 1 is now being inspected; Preline_Obji_R represents the X-axis coordinate of a right end point of the image segments of every object i that was found in the $(y-1)^{th}$ row; Preline_Obji_L represents the X-axis coordinate of a left start point of the image segments of every object i that was found in the $(y-1)^{th}$ row; Seg_L represents the X-axis coordinate of a left start point of a newly detected image segment found in the $y^{th}$ row; and Seg_R represents the X-axis coordinate of a right end point of the newly detected image segment found in the $y^{th}$ row. That is, the image processor 33 identifies whether a start point of the newly detect image segment is in front of (e.g. at left side) an end point of the image segment of an object in an immediately previous row or an immediately previous column, and whether an end point of the newly detect image segment is behind (e.g. at right side) a start point of the image segment of the same object in an immediately previous row or an immediately previous column.

Then the image processor 33 associates the information of the newly detected image segment being recorded to an object to which the newly detected image segment belongs (Step 106) and stores the information of the object being associated with the information of the newly detected image segment in the register 34.

In order to decrease the occupied data space of the register 34, the image processor 33 then identifies whether there is a complete object or a merged object in the image 1 (Step 107). When a merged object is identified, the data space occupied by the merged object is released (Step 108a), wherein a method of identifying whether an object is merged is to identify whether a newly detected image segment simultaneously belongs to a plurality of objects. When a complete object is identified, the image processor 33 identifies whether the complete object is an invalid object (Step 108b), wherein an object is identified as a complete object when there is no newly detected image segment associated thereto when the inspection of all pixels of a pixel row or a pixel column is accomplished, i.e. a complete object is the object without being associated with any newly detected image segment. When an invalid object is identified, the data space occupied by the invalid object is released (Step 109), wherein a method of identifying whether an object is invalid is to identify whether a size, a total brightness or an average brightness of the object is within a predetermined range. The information of the object whose data space is not released will still be stored in the register 34. Then a next image segment (if there is any) located in the current inspected row will be identified by using the same steps, and the recognition of multiple objects in the image 1 is accomplished at the time that all pixels of the image 1 are acquired.

Referring to FIGS. 1 to 6, the image recognition method for recognizing multiple objects of the present invention will be illustrated with embodiments hereinafter. Assuming the pixels of the image 1 are read row-by-row starting from the first row. Since a pixel value greater than the system predetermined threshold value is identified at coordinates (3,1), the coordinates and pixel value of the start point 111a of a newly detected image segment 111 will be stored in the register 34. Then, the information of the newly detected image segment 111 is recorded pixel-by-pixel and stored in the register 34 till an end point 111b of the newly detected image segment 111 is identified. Next, the coordinates and pixel value of the end point 111b will be stored in the register 34. However, since there is another newly detected image segment 121 in the first row of the image 1, the coordinates and pixel values of the start point 121a and end point 121b and the information of pixels therebetween of the newly detected image segment 121 are stored in the register 34 pixel-by-pixel. Therefore, two image segments 111 and 121 respectively belong to two objects are now stored in the register 34 after the first row of the image 1 is inspected.

Subsequently, the image processor 33 sequentially receives the image information of the second row of the image 1, and records the coordinates and pixel values of the left start points 112a, 122a and the coordinates and pixel values of the right end points 112b, 122b of every newly detected image segments detected in the second row. Every time a right end point of a newly detected image segment is read, the image processor 33 identifies whether the newly detected image segment belongs to the objects 11 and/or 12 based on equation 1. This process is performed by a sequence from left to right and up to down so as to record and inspect every pixel of the image 1. Therefore, when the acquisition of all pixels 311 of the image 1 is accomplished, it is able to recognize every objects 11 and 12 in the image 1 in real-time.

In sum, the image recognition method for recognizing multiple objects of the present invention has the following merits:

1. The image recognition method of the present invention performs real-time image recognition by storing a part of an image in a register such that it is not necessary to record the entire image so as to save memory resources.

2. The algorithm adopted in the image recognition method of the present invention is simple and is not constrained by the number of objects in an image. Therefore, the present invention can be used to recognize any number of objects in an image. The present invention has a high expandability and is capable of recognizing objects in an image in real-time.

Furthermore, in order to further decrease the data space of the register 34 being occupied during the recognition process, when an object stored in the register 34 to which a newly detected image segment associates is merged or the information of a complete object satisfies the invalid condition, the data space in the register 34 used to store the object is released thereby decreased the data space of the register 34 being occupied.

Figure 4:
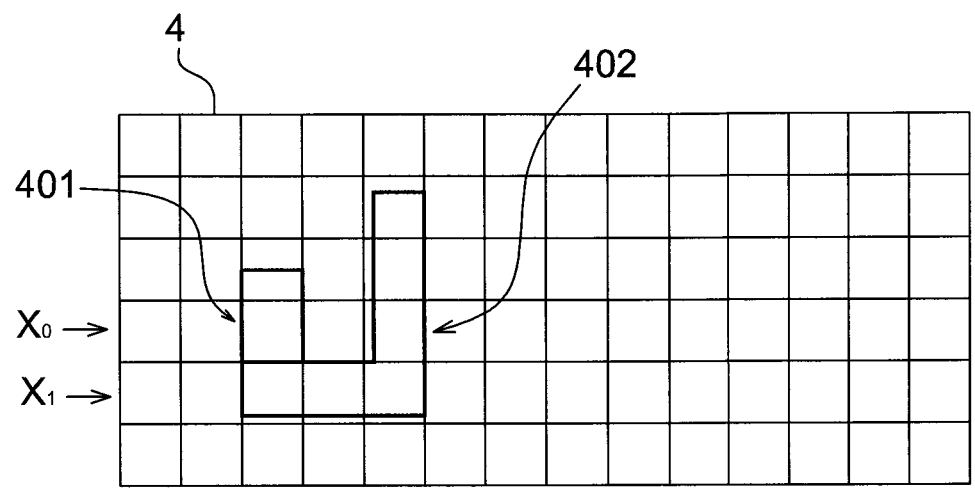
FIG. 4 shows a schematic diagram of identifying a merged object by the image recognition method of the present invention.

Please refer to FIG. 4, it shows a schematic diagram of identifying a merged object by the image recognition method of the present invention. When the image processor 34 finishes the process of the pixel row $X_0$, two objects 401 and 402 are stored in the register 34. However, when processing the pixel row $X_1$, the image processor 33 identifies that the objects 401 and 402 are belong to the same object (i.e. a newly detected image segment in the pixel row $X_1$ simultaneously belongs to the objects 401 and 402) and thus the objects 401 and 402 is merged and the data space originally occupied by the object 401 or 402 is released (Step 108a).

Figure 5:
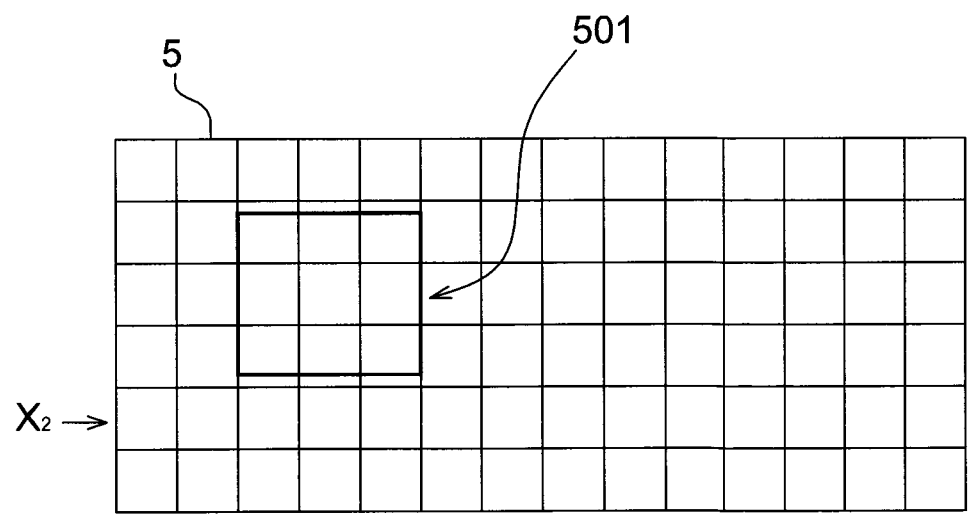
FIG. 5 shows a schematic diagram of identifying a complete object by the image recognition method of the present invention.

Please refer to FIG. 5, it shows a schematic diagram of identifying a complete object by the image recognition method of the present invention. When processing the pixel row $X_2$, since there is no newly detected image segment in the pixel row $X_2$ belonging to an object 501, the image processor 33 identifies that the object 501 is a complete object. Then, the image processor 33 identifies whether the object 501 is an invalid object (Step 108b).

Figure 6:
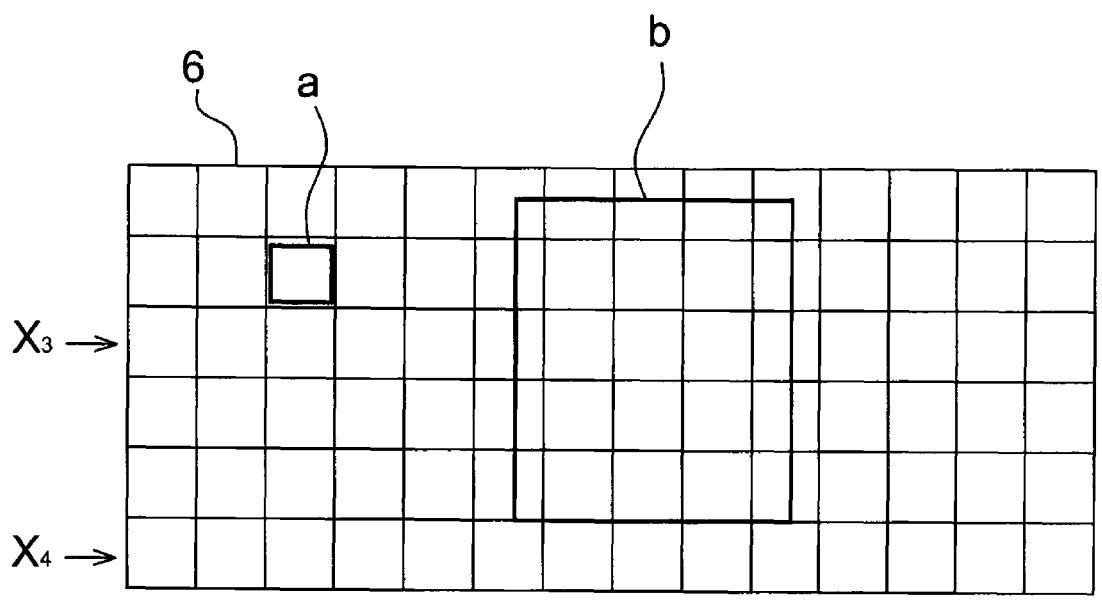
FIG. 6 shows a schematic diagram of identifying an invalid object by the image recognition method of the present invention.

Please refer to FIG. 6, it shows a schematic diagram of identifying an invalid object by the image recognition method of the present invention. A method for identifying an invalid object adopted in the present invention is to identify whether a size, a total brightness or an average brightness of an object image is within a predetermined range. When the size of the object image is too small, or the total brightness or average brightness of the object image is too low, the object image may be the noise in the image 1. For example as shown in FIG. 6, when the image processor 33 is processing the pixel row $X_3$, as the object "a" is identified as a complete object and the size thereof is too small, the object "a" is identified as an invalid object. Therefore, the data space occupied by the object "a" is released. When the size of the object image is too large, or the total brightness or average brightness of the object image is too high, the object image may be an image of other light source or unexpected object inside the operational environment of the image processing system 3. For example as shown in FIG. 6, when the image processor 33 is processing the pixel row $X_4$, as the object "b" is identified as a complete object and the size thereof is too large, the object "b" is also identified as an invalid object. Therefore, the data space occupied by the object "b" is released, wherein a maximum size may be predetermined according to the size of an object that the image processing system 3 is going to recognize.

In the present invention, the register 34 may release the unused data space stored therein for being used by following procedures. Therefore, not only the data space being occupied can be reduced, but also more valid objects can be recognized through releasing unused data space since the space of the register 34 is limited and fixed.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An image recognition method for recognizing a plurality of objects in an image, wherein each object includes a plurality of image segments, and for recording information of the image segments of the objects in a register, the image recognition method comprising:

sequentially acquiring every pixel of the image;
identifying whether a pixel is a start point of a newly detected image segment during said acquiring;
recording information of the newly detected image segment in the register pixel-by-pixel from the start point;
identifying an end point of the newly detected image segment during said recording in the register;
recognizing an object to which the newly detected image segment belongs according to the start point and the end point;
identifying whether there is a complete object;
identifying whether the complete object is an invalid object when a complete object is identified; and
releasing a data space of the invalid object from the register when the invalid object is identified and then continuously acquiring remaining pixels of the image behind the end point of the newly detected image segment.

2. The image recognition method as claimed in claim 1, further comprising:
identifying whether there is a merged object.

3. The image recognition method as claimed in claim 2, further comprising:
releasing a data space of the merged object when a merged object is identified.

4. The image recognition method as claimed in claim 1, wherein said identifying whether the complete object is an invalid object is to identify whether a size, a total brightness or an average brightness of the complete object is within a predetermined range.

5. The image recognition method as claimed in claim 1, further comprising:
associating the information of the newly detected image segment being recorded to the object to which the newly detected image segment belongs.

6. The image recognition method as claimed in claim 1, wherein said acquiring is to sequentially acquire every pixel in every row or every column.

7. The image recognition method as claimed in claim 6, wherein when the acquisition of all pixels in one row or one column is accomplished, an object is identified as a complete object when there is no newly detected image segment associated thereto.

8. An image recognition method for recognizing a plurality of objects in an image, wherein each object includes a plurality of image segments, and for recording information of the image segments of the objects in a register, the image recognition method comprising:
sequentially acquiring every pixel of the image;
identifying whether a pixel is a start point of a newly detected image segment during said acquiring;
recording information of the newly detected image segment in the register pixel-by-pixel from the start point;
identifying an end point of the newly detected image segment during said recording in the register;
recognizing an object to which the newly detected image segment belongs according to the start point and the end point;
identifying whether there is a merged object; and
releasing a data space of the merged object from the register when the merged object is identified and then continuously acquiring remaining pixels of the image behind the end point of the newly detected image segment.

9. The image recognition method as claimed in claim 8, wherein said identifying whether there is a merged object is to identify whether the newly detected image segment simultaneously belongs to more than one objects.

10. The image recognition method as claimed in claim 8, wherein said acquiring is to sequentially acquire every pixel in every row or every column.

11. The image recognition method as claimed in claim 8, further comprising:
associating the information of the newly detected image segment being recorded to the object to which the newly detected image segment belongs.

12. An image recognition method for recognizing a plurality of objects in an image, wherein each object includes a plurality of image segments, and for recording information of the image segments of the objects in a register, the image recognition method comprising:
sequentially acquiring every pixel of the image;
identifying whether a pixel is a start point of a newly detected image segment during said acquiring;
recording information of the newly detected image segment in the register pixel-by-pixel from the start point;
identifying an end point of the newly detected image segment during said recording in the register;
recognizing an object to which the newly detected image segment belongs according to a space relationship between the newly detected image segment and every image segment of the objects in a previous row or a previous column; and
identifying an invalid object or a merged object to release a data space thereof from the register and then continuously acquiring remaining pixels of the image behind the end point of the newly detected image segment.

13. The image recognition method as claimed in claim 12, wherein an invalid object is identified according to a size, a total brightness or an average brightness of an object.

14. The image recognition method as claimed in claim 12, wherein said identifying a merged image is to identify whether the newly detected image segment simultaneously belongs to more than one objects.

15. The image recognition method as claimed in claim 12, wherein the space relationship is to identify
whether the start point of the newly detected image segment is in front of an end point of the image segment of an object in the previous row or the previous column, and
whether the end point of the newly detected image segment is behind a start point of the image segment of the same object in the previous row or the previous column.

16. The image recognition method as claimed in claim 1, wherein a data space not associated with the invalid object is not released and is still stored in the register.

17. The image recognition method as claimed in claim 8, wherein a data space not associated with the merged object is not released and is still stored in the register.

18. The image recognition method as claimed in claim 12, wherein a data space not associated with the invalid object and the merged object is not released and is still stored in the register.

* * * * *